United States Patent [19]

Herrington et al.

[11] Patent Number: 5,168,907
[45] Date of Patent: Dec. 8, 1992

[54] DEBARKER HEAD

[76] Inventors: Byron Herrington, Rte. 1 Box 224K;
Tyler Harvey, P.O. Box 272,
Tylertown, both of Miss. 39667

[21] Appl. No.: 753,347

[22] Filed: Aug. 30, 1991

[51] Int. Cl.⁵ .................. B22G 13/00; B23C 5/02;
B26D 1/12
[52] U.S. Cl. ................... 144/228; 144/218;
144/208 F; 144/241; 407/34; 407/42; 407/59
[58] Field of Search .......... 144/208 R, 208 F, 208 G,
144/218, 228, 240, 241; 407/31, 34, 42, 58, 59

[56] References Cited

U.S. PATENT DOCUMENTS

| 2,645,003 | 7/1953 | Thompson et al. | 407/59 |
| 4,093,392 | 6/1978 | Hopkins | 407/59 |
| 4,506,715 | 3/1985 | Blackwell, Jr. | 144/241 |
| 4,770,219 | 9/1988 | Blackwell, Jr. | 144/241 |
| 4,812,087 | 3/1989 | Stashko | 407/42 |

Primary Examiner—W. Donald Bray
Attorney, Agent, or Firm—Alexander F. Norcross

[57] ABSTRACT

A Rosser type debarker head has a plurality of rounded, indexable cutting teeth spaced in patterns of repeated rows running axially the length of the cylindrical surface, each tooth being spaced along the cylindrical surface so that the total cutting pattern produced by a single rotation of the head creates a uniform round toothed scalloped effect. Each tooth is shadowed by adjacent offset teeth so that only the portion of the round tooth outside of a cord representing essentially one-sixth of the circumference of the tooth is exposed to direct cutting impact. The remainder of the round tooth is shadowed by adjacent cutter teeth. As a result, the debarker head produces a uniform scalloped cut, producing a shallow, smooth cut upon the log with limited splintering, while reducing the impact on the teeth so that tooth life is significantly extended.

12 Claims, 4 Drawing Sheets

DEBARKER HEAD

BACKGROUND OF THE INVENTION

This invention pertains to the field of rotary cutters more specifically to the field of cutters adapted for separating bark from the hardwood of a tree.

In the field of sawmill operation it is necessary, as one of the steps for preparing a tree for further use that the outer bark coating of the tree be separated from the tree. While the technology appears to draw from the field of wood chippers and adzes, it is distinct in that while it is necessary to remove the bark by abrading, it is deleterious to the tree to cut significantly into the wood. Thus a cutting head or adz which is equally adapted to chipping wood as well as bark is unsatisfactory for the use.

Two major forms of debarkers are in common use. Typically each depends upon the fact that the shear strength of the bark is weakest in the cambium layer between the wood and the bark.

Once such form of machine is known as the hollow rotor type in which a plurality of arms, swing mounted to a rotary collar extend inward scraping tangentially in a spiral around the exterior of the tree which is fed through the center of the collar. Typical such cutters are shown in U.S. Pat. No. 4,231,406 to Jonsson and U.S. Pat. No. 4,709,737 to Jonsson.

More commonly used form of debarker is the so-called rosser-head debarker in which a log is traversed past a rotating cylindrical cutter head which rotates against the log, parallel to the axis of the log. As the log is rotated against the head various forms of cutters upon the rosser-head are depended upon to tangentially shear the bark from the log. Typical such prior constructure shown in the Salem rosser-head debarker and the debarkers manufactured by Fulghum Industries, and the Forest Tool Company.

A typical debarker of the radial arm type is manufactured by Valone, Kone, Brunette, Inc.

SUMMARY OF THE INVENTION

This invention relates to an improved debarking head for a rosser-head type debarker.

Rosser-head debarkers are all characterized in comprising a substantially strong metal cylinder affixed to a powered rotating axis which is parallel to the longitudinal axis of a tree to be debarked with periodically extending cutter teeth on the cylindrical outer surface of the debarker head. The impacts upon these cutter teeth are such that they require frequent resetting or replacement and it is difficult to get even two to three months use from a typical debarker head in full industrial usage.

We have discovered a form of pattern and tooth for rosser-type debarker head which produces bark chips which can be directly used for boiler field fuel, being small enough to feed through conveyor and piping system. Further, the particular pattern of the debarker head cutting teeth of our invention produces more uniform chips and a smoother more uniform log surface yielding more lumber as opposed to the prior art rosser-head teeth which create a flailing action removing large barks and large chunks and creating extensive wood splintering. The existence of wood splintering requires a sawmill to remove more wood in the first slabbing operation. Further, inasmuch as slab removed and squaring up a log are typically reduced to wood chips to be used in the manufacture of composite building materials, it has been found that the particular pattern of our head produces a smoother finish on the slab and thus a greater quality and yield of marketable chips.

The debarker head of our invention comprises a plurality of rounded, indexable cutting teeth spaced in patterns of repeated rows running axially the length of the cylindrical surface, each tooth being spaced along the cylindrical surface so that the total cutting shadow produced by a single rotation of the head creates a uniform round toothed scalloped effect. Each tooth is shadowed by adjacent offset teeth so that only the portion of the round tooth outside of a cord representing essentially one-sixth of the circumference of the tooth is exposed to direct cutting impact. The remainder of the round tooth is shadowed by adjacent cutter teeth. As a result, the debarker head of our invention produces a uniform scalloped cut producing both a shallow and smooth cut upon the log with limited splintering and reducing the impact on the teeth so that tooth life is significantly extended.

By shadowing the teeth so that only one-sixth of the tooth circumference is exposed to cutting ax, the head may be renewed by simply providing the teeth as round inserts which may be indexed or rotated when worn exposing a new fresh cutting surface rather than requiring total replacement. Further this produces six cutting surfaces as opposed to the more typical three or four cutting surfaces in prior art insert cutters.

It is found that the combination of limited cutting surface, repeatedly indexable rotatable cutting inserts for overcoming wear, and the uniform offsetting providing a scalloped smooth cut pattern significantly increases the life span of the cutting head. It also produces a much smoother chip in the bar suitable for direct feed to typical boilers, as well as producing a more uniform and smooth slab which increases the ultimate productivity and quality of wood chips from the reduced slab during subsequent sawmill operations upon the timber.

Further, by providing for multiple rotating of the teeth, the debarker head may be sharpened effectively without requiring it to be removed from the machine and without requiring tool maker's skills for removal and sharpening of individual teeth. Thus, an operator may keep his debarker running even through normal sharpening cycles.

It is thus an object of this invention to provide a rotary debarker head which has a significantly increased working life span for removal and rebuilding over debarker heads of the prior art.

It is a further object of this invention to disclose the form of a debarker head which may be more easily resharpened and placed back into operation than prior art debarker heads.

It is a further object of this invention to disclose a debarker head having significantly decreased downtime for resharpening as opposed to prior art debarker heads.

It is a further object of the invention to disclose a rotary debarker head which produces a far more uniform bark chip.

It is a further object of the invention to disclose a debarker head which produces a much smoother and more uniform log for further timber or lumber cutting operation.

These and other objects of the invention may be more clearly seen from the detailed description of the preferred embodiment which follows:

DETAILED DESCRIPTION OF THE PREFERRED EMBODIMENT

Figure 1:
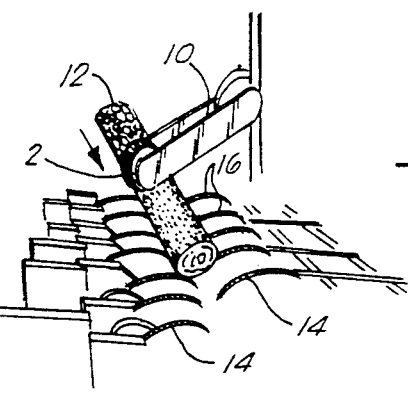
FIG. 1 is a view of a Rosser type debarker head in use in a debarking machine on a log.
Figure 3:
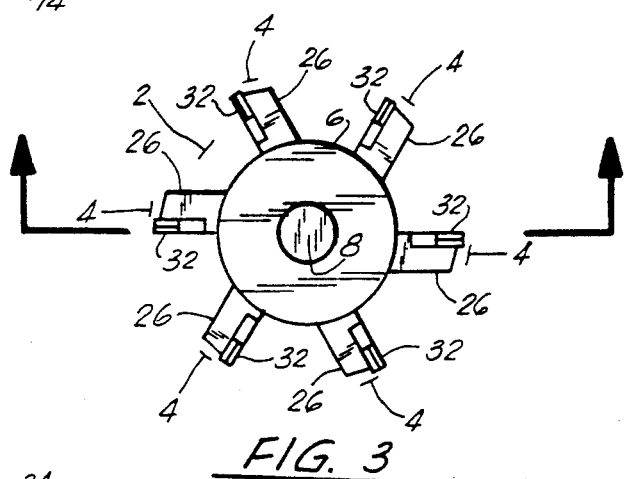
FIG. 3 is an end view of the inventive debarker head.
Figure 2:
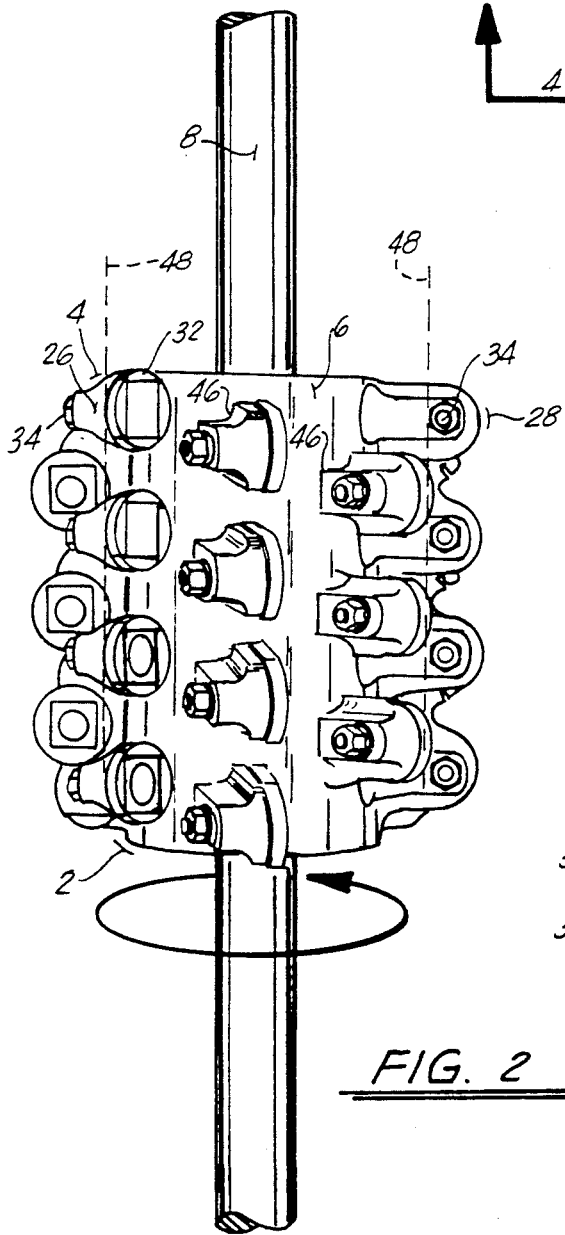
FIG. 2 is a side view of the inventive debarker head mounted for rotation on a axle.
Figure 4:
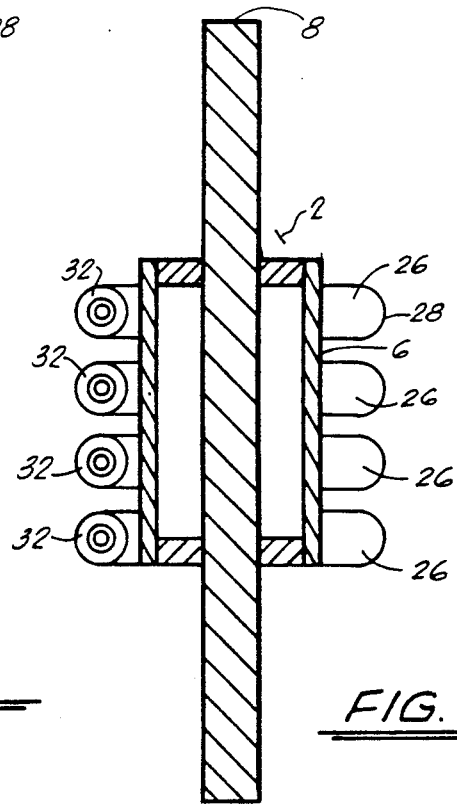
FIG. 4 is a cross section view of the inventive debarker head.
Figure 5:
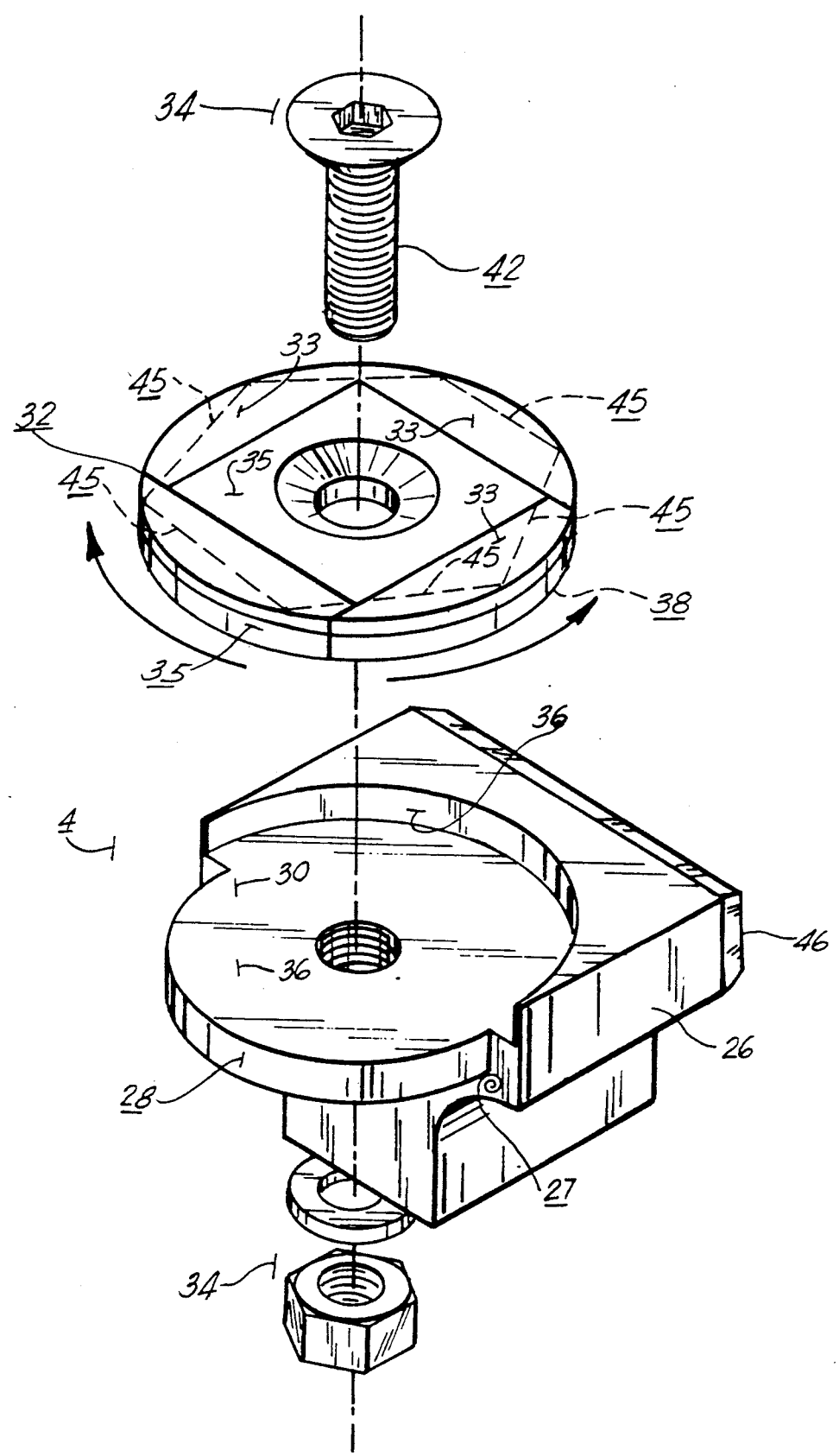
FIG. 5 is an exploded view of the insert and tooth of the invention.
Figure 6:
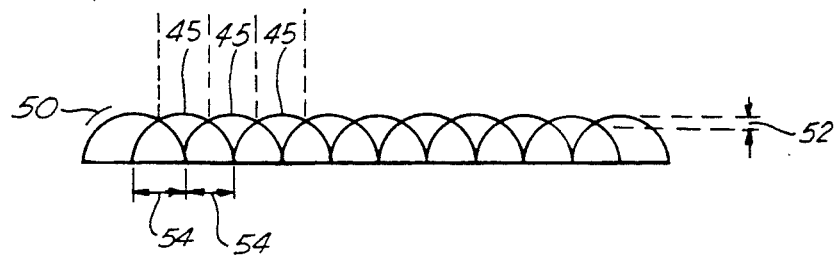
FIG. 6 is a depiction of the scalloped cutting pattern of the invention.
Figure 7:
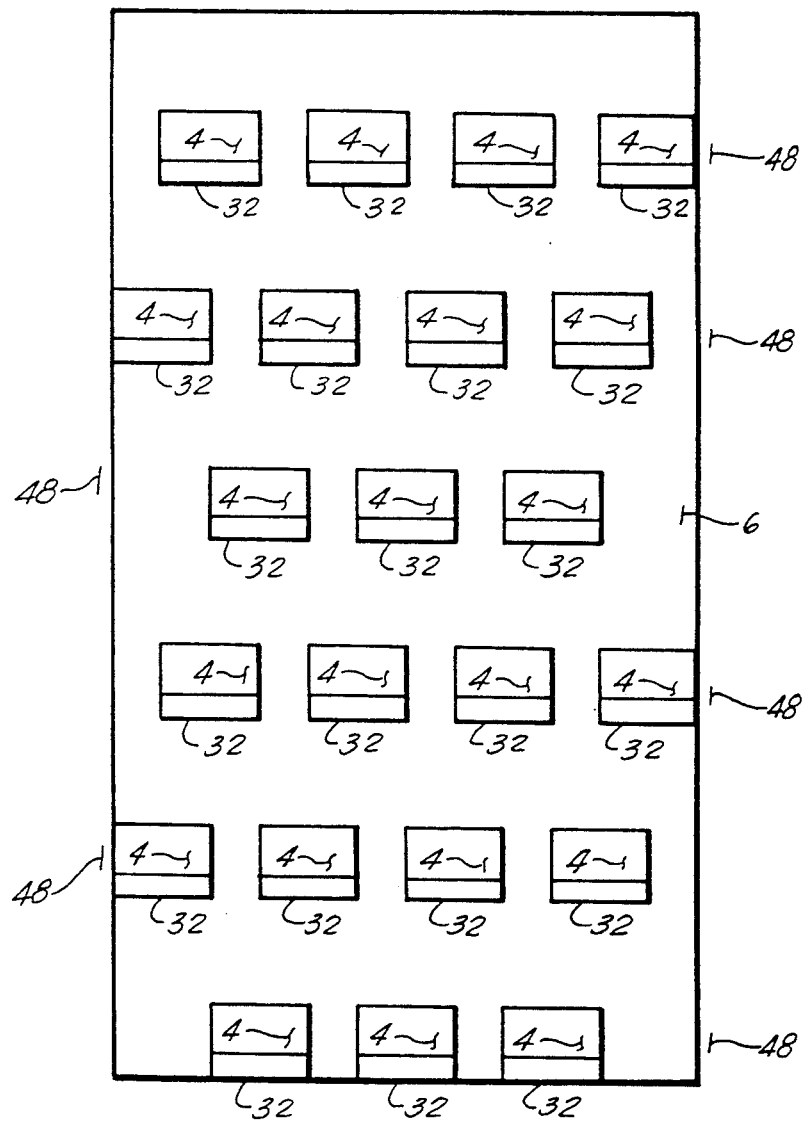
FIG. 7 is an unfolded depiction of the pattern of the rows of teeth on the surface of the debarker teeth.
Figure 8:
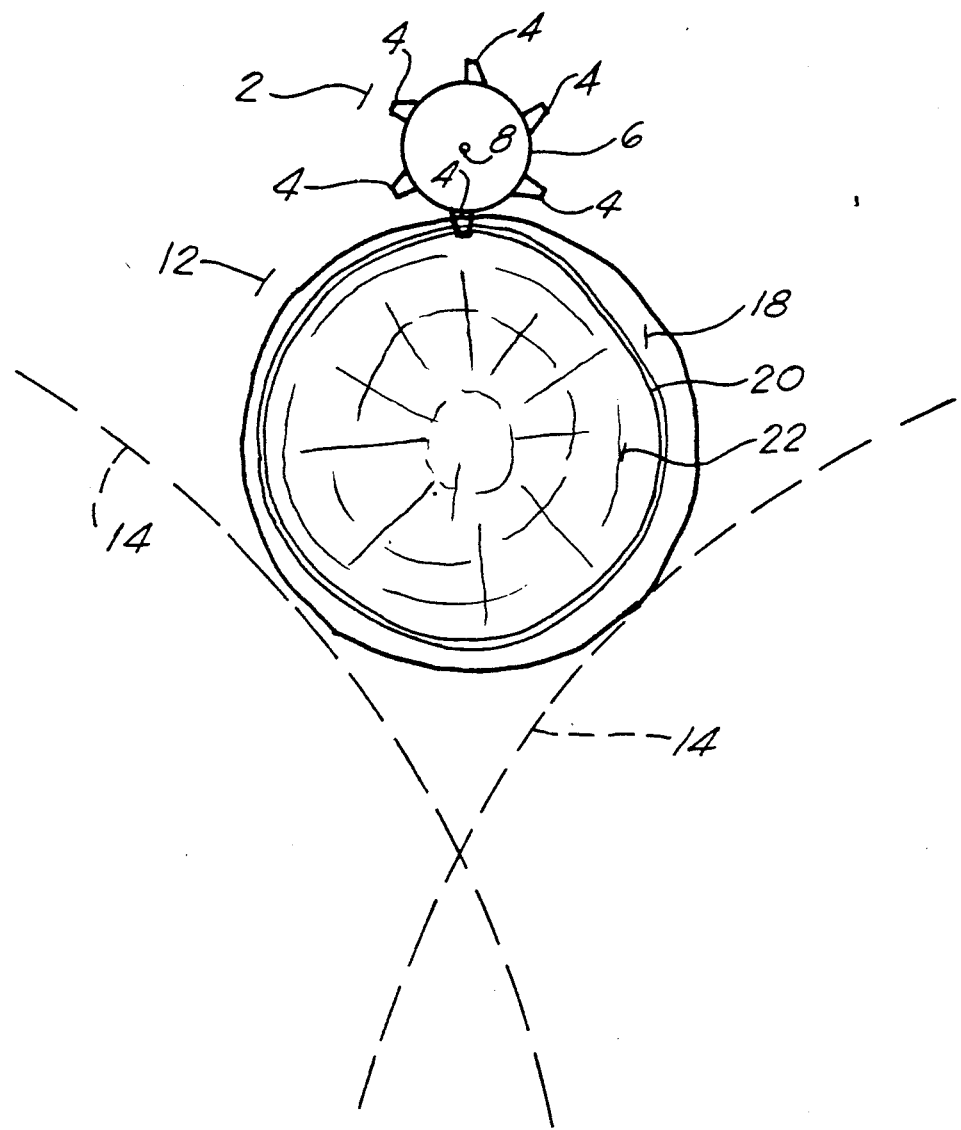
FIG. 8 is an end, cross section view of a log on a debarker using the invention.

This invention relates specifically to the form of debarker head 2 known as rosser type debarker heads utilized in machinery as to the form as shown in the figures.

A rosser type debarker head 2 differs from a swinging arm debarker head principally in that the machine is of the form in which a cylindrical debarker head 2 have a plurality of cutters 4 extending axially from its outer surface 6. It is mounted for rotation upon a rotational axle 8 suspended on a pivoting or swinging arm 6 which may be brought close to or away from or ride upon a log 12 which is supported and spun within a plurality of log support wheels 14 or rollers 14, the debarker head 2 being normally positioned over the log 12, forming a grip on the log between the debarker head 2 and the log support rollers 14.

The log support rollers 14 are typically angled or textured so as to force the log 12 to, as the log 12 rotates under the debarker head 2, move laterally so that the entire length of the log 12 passes at a controllable rate or uniform rate under the debarker head 2 as the debarker head 2 rotates. Alternatively, this may be accomplished by providing wheels or pushers 16 to push the log under the debarker head.

The above applies to Mor Bark K TM Debarker. A typical Rosser Head Debarker uses rollers 14 to revolve the log 12 and mounts the rotary head apparatus 2 on a carriage (not shown) that feeds laterally down the log 12.

Rosser type debarker heads, as with other debarkers, function by chipping away bark. With high speed rotation of the debarker head 2, the individual cutters 4, radiating axially from the cylindrical surface 6 of the debarker head 2, break into the bark 18 of the log. This causes the bark 18 to shear, preferably along the weaker cambium layer 20 which exists in a tree between the bark 18 and the wood 22 of the tree. Rosser type debarkers are typically used in the lumber industry where it is desired that the wood 22 of the tree be maintained in as smooth a condition as possible as the peeled log 12 is to be sawn into timber, lumber and the like. Bark chips 24 have no structural strength and thus are not of use for incorporation in composite material but rather are typically used as a feedstock for boilers and power plants within the lumber mill.

In order to be so used as feed products 24 the chips must be of a uniform small size, but not a powder, and must be adapted to the size found most desirable for powered feed in preexisting machinery provided for feeding chips to the boilers and power plants of a lumber mill. Thus, if chips 24, as provided from a debarker, are too large, or are strips or the like, these chips 24 must be further cut. This adds to the cost of processing and feed for the boiler. If the chips are too small or powdered they may not be fed to the boilers and their economic value is lost, equally increasing the cost of lumber processing.

Referring to the drawings, I show in the form of my improved rosser type debarker head a cylindrical rosser type debarker head 2 having mounted thereupon a plurality of cutting elements 4 of a unique form described as follows. Each of the individual cutting elements 4 is formed of an extended, extruded welded base member 26 extending axially out from the cutter head 2. Each base member 26 terminates in a curved, radiused outer end 28 having a bottom receiving face 30 for receiving a hardened cutting insert 32. Means 34 are provided within each base member or tooth 26 for fastening the cutter insert 32 to the tooth 26. Such means are well understood to those in the toolmaker's art, and typically are in the form of a faced receiving receptacle 36 for mating with the back 38 of a provided cylindrical hardened cutter insert 32 or disk shaped hardened cutter insert 32. A central receiving threaded aperture 40 receives a stud or screw 42 for fastening the cutter insert 32.

Thus the active part of each individual tooth 36 which forms the active cutting face 44, is a curved shaped cutter insert 32. Preferably this insert 32 is of a form having a circular outer edge, a slightly convex upper face 38 for mating with the debarker tooth 36 and having a flat, bottom cutting face 44.

The debarker tooth 36 itself is typically formed of a casting, being widest at its base 46 where the debarker tooth 36 is attached to the head 2 and being narrower behind the insert 32 so that the debarker tooth insert 322 forms the sole point of contact or impact with bark 18 and the log 12 during operation of the debarker. Along a half radius of the debarker tooth 36, typically for a distance equal to about one percent of the radius of the debarker insert 32, the tooth 26 is cut away, forming a cutter edge masked gap 27, so as to expose only a an angled section of the radial edge of the cutter insert 32.

The cutter insert 32 itself is preferably made as a strong metal support member 35 having recesses into which carbide insets 33 are secured, forming a cutter insert 32 which has an optimun combination of toughness, from the support member 35 and hardness, from the carbide insets 33, and having a round outer periphery and a center hole 40 for adopting and receiving a securing bolt 42 or stud 42 so as to be held to the debarker tooth 26. The debarker tooth 26 being radiused to match the upper radius of the cutter insert 32, the insert 32 fits within the debarker tooth 26 and resists shifting out of place under impact and load.

The carbide insets 33 are overlapped 33A so that around the preimeter of the cutter insert 32 there is, at all angles, a carbide faced cutting surface 44. This continuous carbide faced cutting surface 44 then permits the repeated indexing of the insert 32.

By making the insert 32 in a round or curved configuration, it is continuously indexable, that is, it may be rotated about its mouunting bolt 42 as mounted on the debarker tooth to expose unused cutter radial edge, effectively renewing the sharpness of the cutter tooth 26. For the preferred round cutter insert 32, this rotation preferably is by a periodic amount. In contrast to prismatic inserts, there is no requirement that the insert 32 be precisely aligned with its mount, and thus indexing of the inserts 32 of the invention does not require the skilled toolmaker craft work of prior art cutter inserts.

A typical debarker tooth 26 for the preferred embodiment of the debarker head 2, the debarker head 2 having a cylindrical radius of 3½ inches, is positioned so that the outer edge of the cutter insert 32 is at its maximum extent 45, a little less than a 6 inch radius; and each cutter insert 32 is of a 2 inch radius.

Each individual debarker tooth 26 is installed around the outer surface 6 of the debarker head 2 in serrated rows 48, a plurality of debarker teeth 26 being in each row, and each row 48 being laterally offset so that in total, as the debarker head 2 is rotated, the outer edge or cutting toe 45 of each successive cutter insert 32 is offset from all other cutting inserts 32 of the head 2 a uniform amount. This, of course, is established by the portioning of the debarker teeth 26 on the debarker head 2.

The number of debarker teeth 26 upon the debarker head 2, the offset of the debarker teeth 26 and the diameter of each individual debarker tooth insert 32 are mutually chosen such that the offset between the position of adjacent debarker teeth inserts 32, as the debarker head 2 is rotated, is substantially equal to 1/6 of the circumference of each individual cutter insert 32.

Referring to the figures, it can be seen that this form of offset creates a shallow scalloped pattern in which any individual debarker cutter insert 32 defines a cutting arc or cutting edge 45 that is substantially equal to 1/6 of the circumference of the individual debarker insert 32.

In use, the head 2 of the invention is assembled by inserting and clamping the inserts 32 within the debarker teeth 26. The inventive debarker head 2 is then installed as a standard rosser head debarker head in a rosser type debarker. For debarking, a log 12 is placed into the rosser type debarker and rotated, the debarker head 2 being rotated against the log and brought into contact therewith. The unique scalloped cutting pattern 50 caused by the combination of the offset of the individual debarker head teeth 26 and the round cut and shape of each individual cutting insert 32 provides a shallow, uniform cut pattern within the bark as the debarker head 2 cuts into the bark 18.

Further, the depth of the cut 52 is controlled by the impact pattern of adjacent debarker inserts 32 as the debarker head 2 rotates. The depth of cut is maintained substantially at a radius of the debarker active cutting edge 45, which is the cordal section of the debarker insert subtended to form a 1/6 circumference. Only that 1/6 portion of the debarker insert 32 actually impacts the log and is subjected to wear and impact forces; as the debarker head rotates rapidly against the log, the shoulder 54 of the adjacent debarker teeth 26 prevents the cut depth 52 from being any deeper than the depth where adjacent shoulders 54 overlap. This is a showing effect, where the shoulder of adjacent debarker teeth 54 in essence overlap in their rotational path to form non-cutting or shadow regions, limiting the depth of cut.

It is found that this cutting pattern 50 produces a uniform small sized bark chip 24 which is ideally suited for feeding to the typically found boiler feeding machinery within a lumber and sawmill.

It is further found that the controlled depth 52 of the cut occurring as a result of the shadowing effect of the adjacent offset debarker teeth 26 as the debarker head 2 is rotated, combined with the round face or curved aspect presented by the debarker cutter insert 32, produces a minimum of splintering within the underlying wood 22 and provides a uniformly, relatively smooth surface. As an example, within the sizes given above for the embodiment of the invention having two inch diameter inserts 32, that is, teeth of a one inch radius, the actual cutting depth is approximately 0.37 inch and thus the scalloped pattern 50 produced along the log 12 upon removal of the bark 18 is that of a smoothly undulating pattern having a maximum depth of about 0.37 inch. This pattern eliminates the substantial splintering and shredding typically found with the flat edged cutting teeth of the prior art debarker heads.

Inasmuch as the nonuniform outer surface of the log must be sawn off, or slabbed, in order to render the log into a square or rectangular shape for sawing into lumber, this minimization of splintering and cutting in the outer surface of the log minimizes the waste inherent in these sawn outer portions of the log or slabs.

Further, inasmuch as the primary economic use of the slab is to be chipped by a wood chipper for incorporation into various composite and particle boards, it has been found that slabs that have been debarked by the inventive debarker head 2, having the smoothly scalloped outer surface produced by the inventive debarker head 2, produce a higher quality, more uniform chip, having a higher economic value within the particle board after market.

It may be appreciated that extreme forces are imposed upon a rosser head debarker during the process of debarking, and the resulting wear is very heavy. In prior art debarkers, the debarker head must be taken out of service and the cutters replaced and resharpened so frequently that, typically, the normal life span of a debarker head in use is three months.

By providing the debarker cutting edges as curved inserts 32, either round or provided in various curves to provide the desirable scalloped and offset effect 3 above stated, I have discovered that, in lieu of the inserts 32 having to be totally replaced, the bolt 42 may be loosened and the inserts 32 rotated providing a new cutting surface. For the round inserts 32 of the preferred embodiment, this permits six rotations of the tooth before the debarker head 2 must be taken out of service and all the inserts 32 replaced. This compares with the prior art fixed teeth which require the head to be taken completely out of service and sharpened by a skilled tool maker.

Further, unlike the prismatic inserts of the prior art, since the cutter inserts of the current invention are smoothly arced shapes, relatively unskilled labor can easily loosen, reposition and retighten the inserts 32 while the debarker head is installed on the machine. This compares with the extensive downtime necessary for removal of the debarker head required in the prior art, to permit removal and positioning of prismatic inserts which must be exactly aligned within a cutting tool.

Thus the life span of the inventive debarker head 2 is up to six times that of a debarker head with regular cutting teeth and up to twice that of a debarker head with inserts of the prior art. Further, the scalloped pattern 50 and limited cutting edge 45 exposure of the inserts 32 permits a harder insert 32 to be used (harder inserts being more brittle) with less danger of impact and breakage. This is shown by the production of more uniformly sized chips which shows a more uniform impact loading upon the teeth. The overall result is a debarker head whose life span may be measured in years rather than in months.

As an example, the initial prototype version of the inventive debarker head was placed into test service to determine its life span. When removed for inspection after a year and one-half's test usage, it was found to be still serviceable; this compares to a three month life span for a typical rosser head debarker head of the prior art.

It can thus be seen that the debarker head 2 disclosed here represents a considerable improvement over the prior art. It is preferred that the rosser head debarker of the invention use round inserts, although it can be seen that many advantages of the head would occur with curved inserts. Further, the exact form of the round inserts and the form of the support tooth permits many variations in detail.

For this reason this invention extends to those wider equivalents and variations in the form of a rosser type debarker head as are inherent in the claims.

I claim:

1. A debarker head comprising in combination:
a cylindrical base mounted for axial rotation;
a plurality of cutter teeth extending radially from said cylindrical head;
said cutter teeth being arranged in rows extending parallel to the axis of the cylindrical base;
the rotation of the cylindrical base defining a cutter path for each said tooth;
each said tooth being offset;
the cutter path of adjacent offset teeth defining an exposed cutting edge and a shadowed non-cutting portion;
the exposed cutting edge creating a scalloped tooth impact profile.

2. The apparatus of claim 1 wherein each said cutter tooth is curved and the spacing of adjacent offset cutter teeth is spaced a percentage of the curvature of each tooth.

3. The apparatus of claim 1 wherein each said cutter tooth is round and the spacing of adjacent offset cutter teeth is spaced a percentage of the radius of each tooth.

4. The apparatus of claim 1 wherein adjacent teeth are offset a distance equal to the extension of each individual tooth such that the cut chip pattern is equal in length and in depth.

5. The apparatus of claim 1 wherein each tooth is offset such that the exposed cutter tooth subtends a radial angle approximately but slightly less than sixty degrees of arc.

6. The apparatus of claim 3 wherein adjacent teeth are offset a distance equal to the maximum cutting depth of each individual tooth such that the scalloped pattern is equal in length and in depth.

7. The apparatus of claim 3 wherein each tooth is offset such that the exposed cutter tooth subtends a radial angle approximately sixty degrees of arc.

8. The apparatus of claim 1 wherein each said tooth comprises a support base affixed to the cylindrical base and a replaceable cutter insert.

9. The apparatus of claim 8 further comprising means for rotating said cutter insert to expose a new cutting edge.

10. The apparatus of claim 3 wherein each said tooth comprises a support base affixed to the cylindrical base and a replaceable round cutter insert.

11. The apparatus of claim 3 further comprising means for rotating said round cutter insert to expose a new cutting edge.

12. The apparatus of claim 11 further comprising:
said means for rotating said round cutter insert permitting successive rotations each of approximately sixty degrees.

* * * * *